J. H. MUMMA.
Straw Cutter.
No. 26,046.
Patented Nov. 8, 1859.
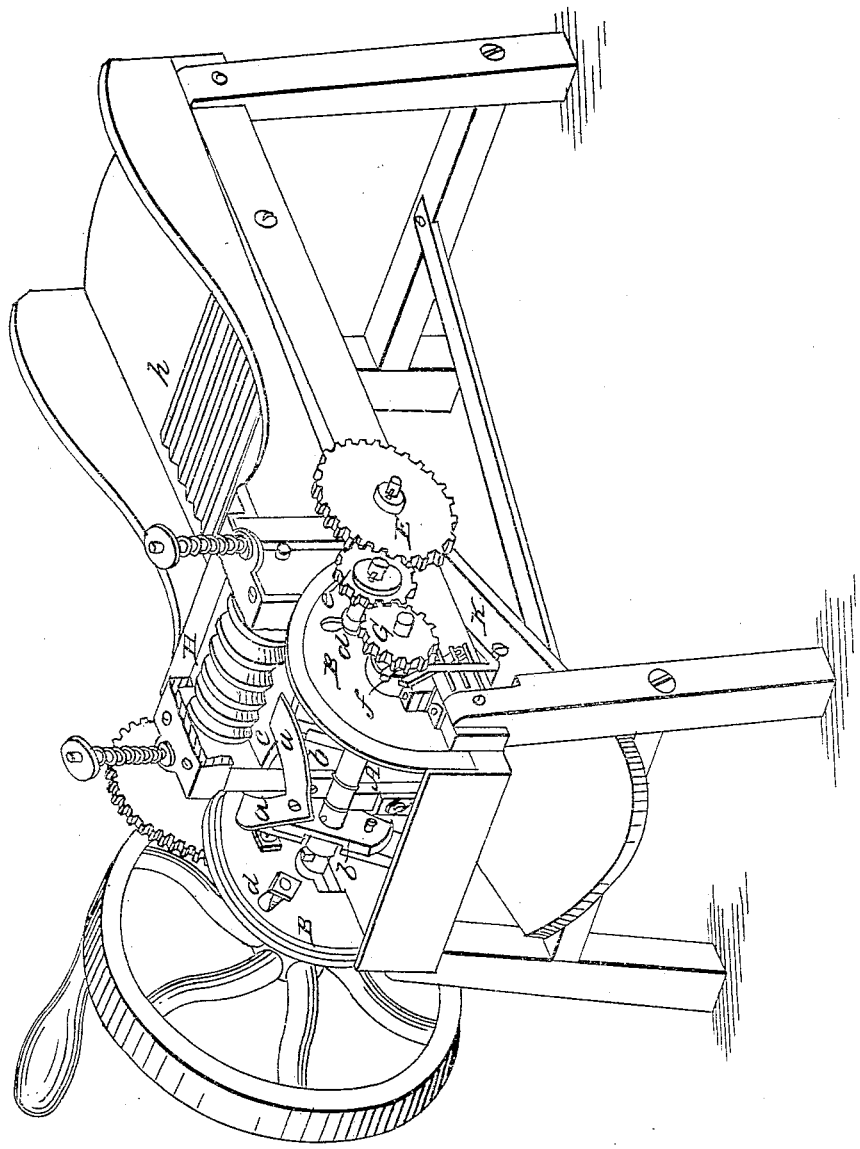

UNITED STATES PATENT OFFICE.

JACOB H. MUMMA, OF HARRISBURG, PENNSYLVANIA.

STRAW-CUTTER.

Specification forming part of Letters Patent No. 26,046, dated November 8, 1859; Reissued March 21, 1865, No. 1,906.

*To all whom it may concern:*

Be it known that I, JACOB H. MUMMA, of Harrisburg, in the county of Dauphin and State of Pennsylvania, have invented certain new and useful Improvements in Fodder and Straw Cutters; and I do hereby declare that the following is a full, clear, and exact description of the same, reference being had to the accompanying drawings, making a part of this specification.

The nature of my improvement consists in the employment of feed rollers of such form when arranged and combined with a hawk bill cutter and bar that in chaffing corn stalks they can be split lengthwise by said rollers; and in cutting hay or straw said rollers shall divide it into separate and distinct parcels and more perfectly retain the material to be cut by the revolving knives; in other machines the tendency to drive to the side by the draft of the cut, has created a difficulty, which my improvement in the rollers obviates.

A second improvement is in the form of the knives viz a hawk bill cutter, susceptible of adjustment, the point of which enters the material to be cut at the center and is followed by the shear cut of the blade, with little power employed; third, in the slat movable bed by which the straw, &c., is jostled and also fed up to the splitting rollers, thus making a partial feed to them.

To enable others skilled in the art to use and construct my machine, I would thus describe it.

A, is the shaft carrying the hawk bill cutters $a, a$. They are secured to the shaft by arms $b$ and admit of being adjusted in their relation to the fixed cutter bar C: which is secured at the rear of the head or side plates B, B.

The cutters resemble a hawk's bill, being angular in form with cutting edges conjoining at the angle thus making a point of the cutter.

The adjustment of the point and ends of the cutter blade is by means of slotted bars which can be lengthened or shortened and secured by set screws on the arms ($b\ b$). The fixed cutter bar C instead of being straight is slightly waved on its edge to conform with the circles described by the revolution of the cutters, the angles by which the cutter bar C is secured to the side plates also conform with the same.

In the head B on the right, there is an oblong slot ($d$) in which is secured a shaft carrying a pinion ($e$) and by which the lower roller E is driven by the pinion meshing with the wheel G. In the head on the left is also a slot and pinion meshing with an additional pinion by which the upper roller H is moved in concert with the lower one.

The upper roller has fixed bearings but the lower one is suspended by stirrup straps provided with helical springs, so as to allow of the advance or retreat of the roller; on the end of shaft A is a tappet, $f$, which carries forward an arm and rod ($k$) connected with and employed for closing a set of movable slats ($h$) which slats on their release of the rod and tappet are thrown open and forward by a suitable spring, thus making a slat feed and sifter for dust, &c.

The slots in the head B B allow of a change of feed by substituting a pinion with more or less teeth, by which the straw &c. may be cut to any desirable length, the shafts of the pinions being moved to suit the pinion and afterward secured in the slots by a screw and nut.

By the increase of number of teeth in the shifting pinion, the diameter is increased, rendering it necessary that the above provision be made for changing their centers from the feed rollers and pinion on the main shaft.

What I claim as my invention and desire to secure by Letters Patent is—

1. The employment of a hawk bill cutter ($a\ a$) constructed and arranged as described, in connection with a cutter bar (C) of a straw cutter operating in the manner as and for the purposes set forth.

2. I claim the slat bed ($h$) for the purpose of not only cleaning the material from dirt, but also as a feed to the rollers: substantially in the manner and for the purposes set forth.

3. I claim the employment of the ribbed feed rollers for crushing and dividing the sheet of material to be cut when arranged and combined with a hawk bill cutter $a, a,$ and bar C, substantially in the manner set forth.

In testimony I have signed my name before witnesses.

J. H. MUMMA.

Witnesses:
JOHN F. CLARK,
JNO. H. JOHNSON.